April 18, 1933.     G. P. BEAUDRY     1,904,816
INTERNAL COMBUSTION ENGINE
Filed Feb. 14, 1930     2 Sheets-Sheet 1

WITNESSES
Edw. Thorpe
Chris Feinle

INVENTOR
G. P. Beaudry
BY
ATTORNEY

April 18, 1933.    G. P. BEAUDRY    1,904,816
INTERNAL COMBUSTION ENGINE
Filed Feb. 14, 1930    2 Sheets-Sheet 2

WITNESSES
Edw. Thorpe
Chris Feinle

INVENTOR
G. P. Beaudry
BY
ATTORNEY

Patented Apr. 18, 1933

1,904,816

UNITED STATES PATENT OFFICE

GEORGE P. BEAUDRY, OF MONTREAL, QUEBEC, CANADA

INTERNAL COMBUSTION ENGINE

Application filed February 14, 1930. Serial No. 428,478.

This invention relates to improvements in internal combustion engines of the type disclosed in United States Patent No. 1,751,385, of March 18, 1930, granted to me. The engines in conjunction with which the present invention is used are of the single or multiple unit twin cylinder types which operate according to the four cycle principle. The twin cylinders consist of a compression cylinder and a power cylinder in communication with each other, and each cylinder having its own piston operatively connected with a common crank shaft, the cranks for the respective pistons being disposed at relatively different angles. The provision and arrangement is such that the fuel mixture will be compressed the desired degree, then be delivered into the power cylinder, and then be exploded in the power cylinder to act on the piston therein to drive the crank shaft.

One of the objects of the invention is the provision in an engine of the indicated type of improved means for controlling the admission of the fuel mixture into the compression cylinder, its compression therein, its delivery to the power cylinder, and the discharge of the exhaust or burned gases from the power cylinder by the motion of the crank rods in such a novel manner that the period of the revolution of the crank at which the above events take place is different from the period at which they occur in other engines, and also the arrangement is such that the time of duration of said intake, admission and exhaust is longer than in other types which perform these operations in one revolution of the crank shaft.

In accordance with the above object of the invention greater efficiency and power are obtained by preventing loss of energy through the exhaust caused by the too early opening of the exhaust valve and by preventing unnecessary overheating of parts such as crank rods and their wrist pin, and of the piston itself by the hot exhaust gases and therefore with this new arrangement of parts the heat of all moving parts requiring lubrication is rapidly dissipated and better cooling is incidentally secured.

Another object of the invention which applies most particularly to the time at which admission of the charge is made to the power cylinder and which makes the operation of the present engine quite different from the one described in my Patent No. 1,751,385, bearing dates of May 18, 1930, is as follows: In the previous patent the admission of the charge to the power cylinder can only take place at the extreme top of the power stroke and admission port remains open after the power crank has passed the upper dead center; it is therefore necessary that ignition of the charge be made well past upper dead center after closing of the admission port.

In the present invention the charge begins to enter the power cylinder approximately 35 degrees before upper dead center of the power cylinder and closes approximately 10 degrees past the same dead center allowing the charge to be ignited at any desired point starting 20 degrees before the upper dead center of the power cylinder. This is recognized by those conversant in this art as the best condition for efficient operation, owing to the time required for the propagation of the ignition flame.

Furthermore, according to another feature of the invention the stroke of the power piston is made longer so that the clearance ratio of said power piston is 10 to 1 or even a higher value, and that the stroke of the compression piston is so arranged that the clearance ratio in said compression cylinder is 8 to 1. This is an entirely new feature in the art since no other engine of this type now in use can realize these advantages. These features increase the usefulness and efficiency of this class of engine here described. Two important advantages result from the large ratio of clearance and long piston stroke. First, the compression attained in a single upward stroke of the compression piston produces higher compression than it is possible to attain in other types before the charge enters the power cylinder. This results in delivering a denser charge to the power cylinder and increases the power for a given size of cylinder. Secondly, the high ratio of clearance of the power piston produces an expansion of the charge double the length of other types now in use where the practical limit of clearance ratio is approximately 5 to 1. The ratio of clearance used in this invention results in a large saving of energy because in the present day engine the exhaust valve opens when the pressure and temperature in the cylinder are still high. In the new engine here described the expansion of the charge is prolonged until the pressure in the cylinder is very low and when the exhaust port is opened the spent gases are evacuated by the upward stroke of the power piston. Such evacuation of the spent charge cannot be obtained in other engines where there is an explosion at every revolution of the crank.

The greater expansion of the charge in this engine also produces a cooling of the charge and more heat is transformed into mechanical work. To make this point more evident it must be remembered that: "when a gas is compressed heat is produced and when a gas is expanded heat disappears". This effect has a real importance in solving the problem of loss in internal combustion engines and cannot be produced to the same extent in engines now in use. By providing the direct and rapid cooling of the charge by its own expansion much of the heat is prevented from radiating to the cylinder wall and a large saving of energy is effected. The most important differences between the engine described here and other engines which perform all the operation of the cycle in one complete revolution of the crank are as follows:

*First.*—The period at which the compressed charge is admitted in the power cylinder is different and the manner in which said charge is compressed is also different. In the two-cycle engine, which in appearance resembles the type here described, the charge is compressed in the crank case of the engine at not over 15 lbs. per square inch, then the admission is made to the power cylinder at the lower end of the power stroke substantially at the same moment as the exhaust port is opened, after closing of both exhaust and admission ports also at the lower end of the stroke the charge is again compressed to about 70 lbs. per square inch. In the invention described in this specification the process is entirely different. After the fresh charge has been admitted to the compression cylinder by the downward stroke of the piston the intake port closes at the lower end of the stroke and the charge is rapidly compressed in a single upward stroke of the compression piston to a high pressure in the neighborhood of 120 lbs. per square inch then the admission port opens and the charge is transferred to the power cylinder at the upper end of the power stroke and as no further compression takes place in the power cylinder the charge is immediately fired after closing of the admission port.

*Secondly.*—The length of time in which the exhaust port remains open is different and the period at which exhaust takes place in relation to the time of admission of the charge in the power cylinder is also different. Said exhaust port is also closed at a different period of the cycle in the type of engine forming the subject of our comparison. In the two-cycle engine the exhaust port opens about 40 degrees before the lower dead center of the power piston and closes about 20 degrees past said lower center, the time in which exhaust remains open is approximately 60/360 part of one revolution. In the engine herein described the exhaust opens 35 degrees before lower center of the power cylinder and closes 125 degrees later or 90 degrees past said lower dead center. The time the exhaust remains open equals 125/360 of one revolution or over two times longer. Furthermore the exhaust gases are forced out of the power cylinder by the upward stroke of the piston and said exhaust port is completely closed near the upward end of the stroke before the new highly compressed charge is allowed to enter the power cylinder, also at the upward end of the power stroke.

Another important advantage and also a marked difference which results from the expelling of the spent charge from the power cylinder by the upward stroke of the piston is the fact that in the two-cycle engine a considerable amount of spent gases remains in the cylinder after the exhaust port is closed and the new incoming charge being at low pressure said charge is diluted or weakened by the presence of the residual gas. In the present engine the spent charge is partly cleared away by the upward stroke of the piston and when the admission takes place at high pressure the residual charge in the cylinder is only a small fraction of the weight of the total gas entering the power cylinder, owing to the greater density and pressure of the new charge dilution is insignificant. This results in an increase of power for a given size of cylinder.

Another object of the invention is the provision of a novel combination of parts which operate in such a manner that the engine has no upper dead center, the pressure being applied to the power piston when it is at the upper limit of its upstroke to exert a lever action on the crank rod, which action is in the direction of rotation of its crank. This is important since the engine will not knock either by too high compression or by a premature ignition, or even by the use of a poor grade of fuel.

Another object of the invention is to facilitate the making of repairs or the replacement of worn parts whenever the occasions arise.

With the foregoing and other objects in view the invention resides in the particular provision, construction and operation of the parts hereinafter fully described and illustrated in the accompanying drawings, in which Figure 1 is a vertical section of an internal engine embodying the features of the invention, the compression piston being shown at the limit of its upstroke and the power piston being shown half-way of its travel in its upstroke;

Figure 1:
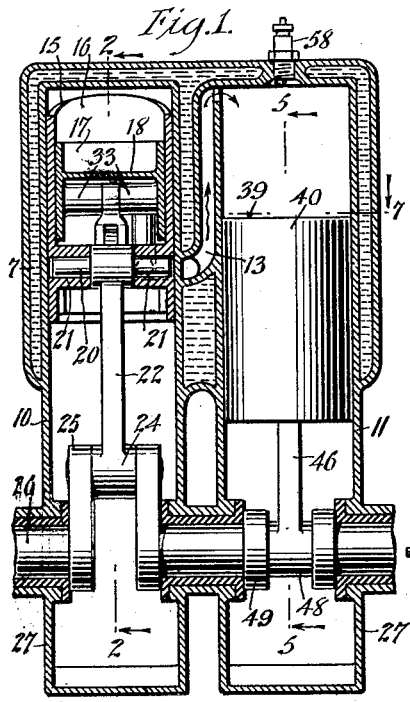
Figure 2:
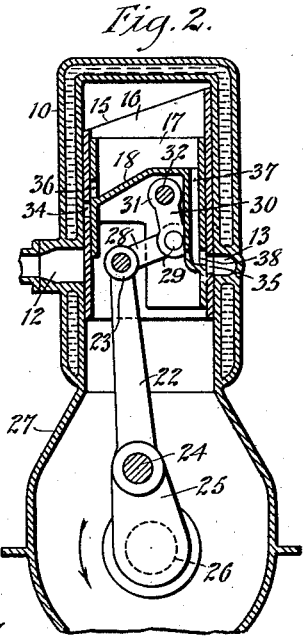
Figure 2 is a section on the line 2—2 of Figure 1.

Referring now more particularly to the views of the drawings, it will be apparent that in the illustrated embodiment, the engine includes two substantially similar water jacketed cylinders 10 and 11. In accordance with the invention, the fuel, such as a gasoline mixture, is sucked into and is compressed in the cylinder 10, and it is therefore to be understood that the cylinder 10 is the compression cylinder of the engine. The cylinder 10 is provided with a fuel intake 12 which communicates directly with the interior of the cylinder. The supply of fuel sucked into the cylinder 10, and which is compressed therein, is transferred to the cylinder 11 to be exploded therein, and it is therefore to be understood that the cylinder 11 is the power cylinder of the engine. The compressed fuel charge in the cylinder 10 passes therefrom to the interior of the cylinder 11 by a passage 13. The passage 13 leads from a point in the side wall of the cylinder 10, substantially half way down from the head of the cylinder 10 thereof and extends laterally and upwardly to a point in the side wall of the cylinder 11 adjacent the head of the latter. The cylinder 11 is provided with an exhaust port 14 located substantially half way down from the head of the cylinder.

Arranged for reciprocation in the cylinder 10 is a piston 15 which consists of parts 16 and 17. The part 16 is of hollow construction open at the opposite ends, and is fitted to slide in contact with the bore of the cylinder 10. The part 16 is of uniform thickness throughout, it being one-eighth of an inch or less. The upper end of the part 16 is cut at an angle. The part 17 is of hollow construction and is provided with a crown or head 18 of angular formation, and is cut away as at 19. The part 17 fits within the part 16 and is slidable relatively thereto. The length of said part 17 does not exceed its diameter. A pin 20 extends transversely of the lower end of the part 16, the opposite ends thereof being journaled in suitable bearings 21 on the part 16. The pin 20 is off center. A crank rod 22 has a wrist 23 on its upper end which is connected with the pin 20 for pivotal movement, and the lower end of the rod 22 is pivotally connected as at 24 with a crank 25 of a crank shaft 26 journaled in suitable bearings carried by a crank case 27. The upper end of the crank rod 22 has an integral extension or short arm 28, disposed at an angle with respect thereto, which is pivotally connected as at 29 with one end of a link 30 whose opposite end is pivotally connected as at 31 with a pin 32, extending transversely of the part 17 near the top thereof. The pin 32 is arranged off center and the opposite ends thereof are supported by suitable bearings 33 carried by the part 17. The part 16 of the piston 15 has ports or openings 34 and 35, respectively, in the opposite sides thereof, the former being located so as to register with the intake 12 and the latter being located so as to register with the passage 13 in the movement of the piston 15. The part 17 of the piston 15 has a port or opening 36 above the head 18 in one side thereof, and a duct or passage 37 which opens through the head 18 and whose lower end terminates in an outlet port 38 in the side wall of the part 17. The port 36 is located so as to register with the port 34 in the part 16, and the port 38 is located so as to register with the port 35 in the part 17, in the movement of the part 17 with respect to the part 16. It will be apparent that by reason of the fact that the part 17 of the piston 15 is cut away as at 19, it is possible to make the part 17 of considerable length and at the same time allow it to have certain movement to the part 16, and also gives proper clearance of the part 17 with respect to the upper end of the crank rod 22 and the bearings 21 which support the pin 20. The part 16 of the piston 15 is long enough to alternately open and close the intake port 12 and to close the passage 13 with each stroke of the piston 15.

Arranged for reciprocation in the cylinder 11 is a piston 39 consisting of parts 40 and 41. The part 40 is of hollow construction and is open at the opposite ends. The part 40 has a sliding fit with the wall of the cylinder 11. The part 41 is of hollow construction and has a crown or head 42 of angular formation, and is cut away as at 43. A pin 44 extends transversely of the lower end of the part 40, the opposite ends thereof being journaled in suitable bearings on the part 40. A crank rod 46 has a wrist 47 on the upper end thereof which is pivotally connected with the pin 44, and the lower end of the rod 46 is pivotally connected as at 48 with a crank 49 of the crank shaft 26. The crank 49 is arranged substantially at 45 degree angle with respect to the crank 25. The crank rod 46 has an integral extension or arm 50 on the upper end thereof disposed at an angle with respect thereto, which is pivotally connected as at 51 with one end of a link 52 whose opposite end is pivotally connected as at 53 with a pin 54. The pin 54 extends transversely of the part 41 near the upper end and is supported by suitable bearings on the part 41. The pins 44 and 54 are arranged off center. By cutting away the part 41 at 43, said part 41 will have clearance with respect to the bearings to allow relative movement of the part 41 with respect to the part 40. The part 40 has a port or opening 56 in the side wall thereof which is located so as to register with the exhaust port 14 in the up and down movement of the piston 39. The part 41 has a port or opening 57 in the side wall thereof above the crown or head 42, which is located to register with the port 56 in the movement of the part 41 with respect to the part 40. The head of the power or combustion cylinder 11 is provided with a suitable spark plug 58 forming part of an ignition system operating in timed accord with the piston 39 for igniting the explosive charges delivered into the cylinder 11 above the piston 39.

Due to the fact that each of the pistons 15 and 39 are made of relatively movable parts, it is possible to admit a maximum amount of fuel mixture into the compression cylinder 10 above the piston, and also to avoid the related cranks being on upper dead centers at the commencement of the downstroke of the piston, particularly the power piston 39. It will also be apparent that by making the power piston 39 of two parts as shown, a relatively long stroke of the piston may be obtained in proportion to the lengths of the related crank and crank rod.

To make the reciprocating parts lighter, namely, the piston and its sliding sleeve, said piston is preferably constructed of aluminum and the sliding cylinder is made of cast iron or semi-steel, the wall of said sleeve or sliding element being not over one-eighth of an inch in thickness and preferably less.

This construction produces a good wearing surface for the sliding element, decreasing friction, and the weight of said reciprocating parts is greatly reduced permitting a higher speed of rotation of the engine.

Figure 3:
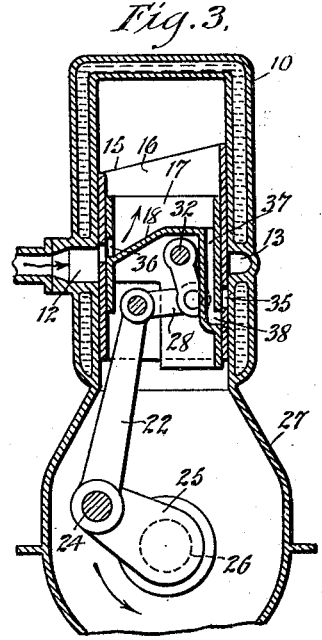
Figure 3 is a view similar to Figure 2, but showing the piston part way of its travel in its downstroke.
Figure 4:
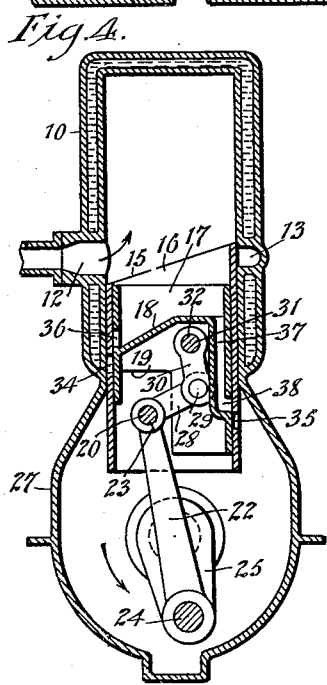
Figure 4 is a view similar to Figure 2, but showing the piston at the limit of its downstroke.
Figure 5:
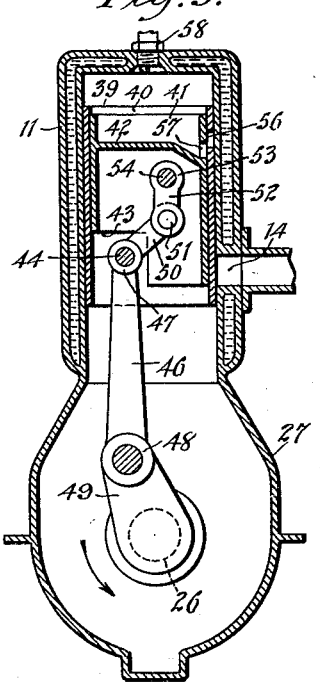
Figure 5 is a section on the line 5—5 of Figure 1, but showing the power piston at the limit of its upstroke.
Figure 6:
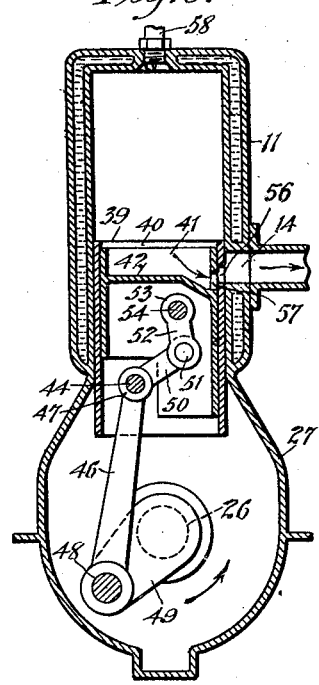
Figure 6 is a view similar to Figure 5, but showing the piston part way of its travel in the downstroke.
Figure 7:
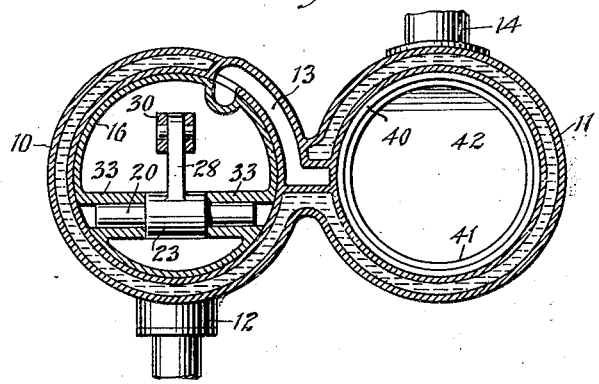
Figure 7 is a section on the line 7—7 of Figure 1.

The operation of the engine is as follows: In the downstroke of the piston 15, the ports 34 and 36 in registration with each other will register with the intake port 12 admitting fuel mixture into the compression cylinder 10 above the crown or head 18 of the piston 15, as shown in Figure 3. The fuel mixture passes from the intake port 12 through the ports 34 and 36. It is also to be observed that as the piston 15 moves on its downstroke, the intake port 12 will be uncovered by the part 16 allowing the fuel mixture to continue to enter the cylinder 10, beginning approximately 55° past upper dead center, as shown in Figure 3, and until the piston 15 has moved 60° past lower dead center with short interruptions of intake of fuel mixture by the upper end of the piston 15. During the downstroke of the piston 15 the inlet end of the passage 13 is kept closed by the part 16. Compression of the fuel mixture takes place during the upstroke of the piston 15 until the piston has reached the limit of its upstroke. During this upstroke the crank 25 passes a point approximately 35° before an upper dead center thereof is reached by said crank, at which time the inlet end of the passage 13 is opened. The compressed charge of fuel in the compression cylinder 10 is transferred or delivered to the cylinder 11 above the crown or head 42. This delivery of the compressed charge of fuel will last during the time required for the piston 15 to reach the limit of its upstroke; that is to say, the compression continues during the time of the admission of the charge into the cylinder 11. Almost immediately after the piston 15 starts on its downstroke, or when it is 10° past upper dead center, the inlet end of the passage 13 will be closed. Immediately after the closing of the inlet end of the passage 13, the power piston 39 is approximately 45° behind the piston 15, and the compression continues in the cylinder 11 until the piston 39 reaches a point in which its crank 49 is at a 17° angle before the upper dead center thereof. Explosion takes place in the cylinder 11, and the charge of fuel expands throughout the the downstroke of the piston 39. The exhaust or burned gas takes place nearly at the end of the downstroke of the piston 39, its crank 49 being at a 35° angle before the lower dead center of the crank. The discharge of the exhaust is brought about by the ports 56 and 57 registering with the exhaust port 14 in the downstroke of the piston 39. The discharge of the exhaust gases continues during one-half of the upstroke of the piston 39. The port 57 is brought into registration with the port 56 by movement of the part 41 with respect to the part 40 in response to the action of a crank rod 46 and the link connection 52. The discharge of the exhaust gas continues until the crank 49 reaches a 90° angle past the lower dead center, after which the exhaust port 14 is closed by the part 40.

Figure 8:
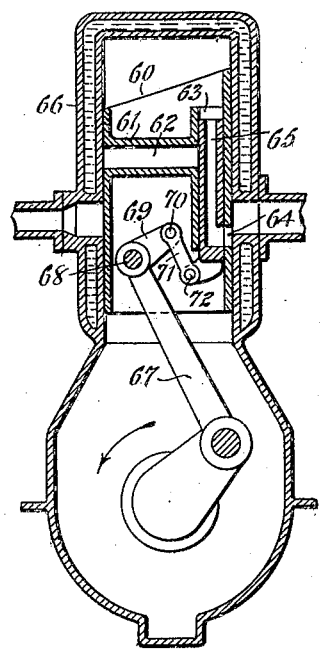
Figure 8 is a vertical section of a modified form of compression piston and piston rod connection.

It is to be understood that the part 17 of the compression piston 15 need not fill the entire space inside of the part 16, but this part 17 may be made smaller and fitted into a suitably sized bore presented by the part 16 which will then have a crown or head as shown in Figure 8. On reference to Figure 8 it will be apparent that there is shown a piston 60 of hollow construction having a crown or head 61 near the upper end with a transverse passage 62 opening through the side of the piston at one end, and its opposite end being in communication with a vertical bore 63. The bore 63 opens through the head 61 and its lower end terminates in an outlet port 64 in the side wall of the piston. A tubular member 65 is slidable in the bore 63. The upper end of the tube 65 is open to the space in the cylinder 66 above the piston 60 and the lower end may be brought into and out of registration with the port 64 in the movement of the member 65. A crank rod 67 has the upper end thereof pivotally connected as at 68 with the piston 60. The upper end of the rod 67 has an integral extension or short arm 69 which is pivotally connected as at 70 with one end of a link 71 whose opposite end is pivotally connected as at 72 with the lower end of the member 65. The operation of this form of piston is substantially identical with that of the piston 15 and its connected parts. It is contemplated to adopt the construction and arrangement shown in Figure 8 of the compression cylinder where no excessive heat is developed. In the combustion or power cylinder however, owing to the very high temperature, use will preferably be made of the piston 39 in order to secure maximum cooling of the parts.

I claim:

1. In an internal combustion engine, the combination of a cylinder, a tubular element arranged within said cylinder and slidable on the wall thereof, a piston slidable in said element, axially alined bearings on said element, a piston rod having axially alined stub shafts on the upper end thereof received in said bearings respectively, said piston having its lower end cut away to allow the lower edge of the piston to fall below said bearings.

2. In an internal combustion engine, the combination of a cylinder, a tubular element arranged within said cylinder and slidable on the wall thereof, a piston slidable within said element, said element having radially inwardly projecting members whereby said element may be supported for movement in said cylinder, said piston having its lower end cut away so that a portion thereof may descend lower than said members.

GEORGE P. BEAUDRY.